(12) United States Patent
Dancy et al.

(10) Patent No.: US 6,577,109 B2
(45) Date of Patent: Jun. 10, 2003

(54) INTERLEAVED POWER CONVERTERS INCORPORATING BANG-BANG CONTROL

(75) Inventors: Abram P. Dancy, Shrewsbury, MA (US); Leif E. LaWhite, Acton, MA (US)

(73) Assignee: SynQor, Inc., Hudson, MA (US)

(*) Notice: Subject to any disclaimer, the term of this patent is extended or adjusted under 35 U.S.C. 154(b) by 0 days.

(21) Appl. No.: 09/932,839

(22) Filed: Aug. 17, 2001

(65) Prior Publication Data

US 2002/0048180 A1 Apr. 25, 2002

Related U.S. Application Data

(60) Provisional application No. 60/227,985, filed on Aug. 25, 2000.

(51) Int. Cl.[7] .................................................. G05F 1/40
(52) U.S. Cl. ........................ 323/272; 323/225; 323/288; 323/351; 363/65
(58) Field of Search ............................ 323/222, 224, 323/225, 271, 272, 259, 282, 284, 285, 288, 350, 351; 363/65

(56) References Cited

U.S. PATENT DOCUMENTS

| | | | | |
|---|---|---|---|---|
| 5,341,278 A | * | 8/1994 | Brooks | ........................ 323/271 |
| 5,870,296 A | | 2/1999 | Schaffer | ...................... 363/65 |
| 6,137,274 A | * | 10/2000 | Rajagopalan | ................ 323/272 |

OTHER PUBLICATIONS

Miwa, Brett A., et al., "High Efficiency Power Factor Correction Using Interleaving Techniques," *IEEE*, pp. 557–568 (1992). (No month).

Lee, Dr. Fred C., "Voltage Regulator Module for Future Generation of Processors," *Powersystems World*, Nov. 10, 1998.

\* cited by examiner

*Primary Examiner*—Jessica Han
(74) *Attorney, Agent, or Firm*—Hamilton, Brook, Smith & Reynolds, P.C.

(57) ABSTRACT

Bang or bang-bang control is applied to interleaved power converters. With the bang control on, oscillator signals applied to the power converters are overridden in order to change the power output of both power converters. When the override is removed, both oscillating signals continue from points in their cycles at which they were overridden. An oscillator may be frozen during override by interrupting the charging and discharging of a capacitor in the oscillator.

15 Claims, 9 Drawing Sheets

INTERLEAVED POWER CONVERTERS INCORPORATING BANG-BANG CONTROL

RELATED APPLICATION(S)

This application claims the benefit of U.S. Provisional Application No. 60/227,985, filed on Aug. 25, 2000. The entire teachings of the above application are incorporated herein by reference.

BACKGROUND OF THE INVENTION

This invention pertains to the control of dc/dc converters, whether they are isolated or non-isolated.

Some loads, such as microprocessors and memory, draw currents that undergo fast transients. When they do, the dc/dc converter that provides power to these loads must maintain its output voltage substantially constant in order for the load to function properly. As an example, the current drawn by a microprocessor available today makes a 25 amp change in less than 1 $\mu$s, during which time its dc supply voltage must not deviate from its nominal value by more than 5%.

A converter may include linear feedback to control the duty cycle of switching elements and thus maintain a desired output. The size of a dc/dc converter's filter elements dictates the speed with which it can respond to a load current transient. These, in turn, are determined by the converter's switching frequency and the amount of ripple that can be tolerated in the converter's input and output waveforms. The higher the switching frequency and the larger the ripple, the smaller the filter elements can be, and the faster the converter can respond to a load transient.

Unfortunately, the higher the switching frequency the lower the converter's efficiency. For many of today's most demanding loads, the switching frequency required to address the transient requirements gives too low an efficiency.

One way to get around this problem is to "interleave" dc/dc converters. With this well-known technique, several dc/dc converters provide the total power required. For example, two or more buck converters (comprised of "main" and "freewheeling" semiconductor switches, inductors, and capacitors) are placed in parallel, with each intended to carry an equal fraction of the total load current. The individual converters all switch at the same frequency, but the switch instants of each converter are phased uniformly over the switching cycle relative to the respective switch instants of the other converters. For example, two converters may be 180 degrees out of phase with respect to each other, three converters may be 120 degrees out of phase and so on. Consequently, the ripple waveforms created by each individual converter are phased with respect to the ripple waveforms of the other converters, and when they are added they cancel each other to a considerable extent.

With this cancellation of the ripple, designers can specify larger individual ripple levels, and therefore smaller filter elements, for each of the individual converters. These smaller filter elements then allow the collective converters to respond much more quickly to a load transient than could a single, more powerful converter switching at the same frequency. The technique of interleaving therefore achieves a faster response without having to raise the switching frequency and suffer the reduction in efficiency that would result.

Another well-known approach used to achieve fast response from a dc/dc converter is called "bang-bang" control. With this approach, the control circuit monitors the output voltage. If it falls below a threshold level set, for example, at 3% below the nominal value of the output, the control circuit immediately raises the converter's duty ratio to its maximum value. This causes the converter's output current to rise as fast as it can. If, on the other hand, the output voltage rises above a threshold level set, for example, at 3% above the nominal output value, the control circuit immediately lowers the converter's duty ratio to its minimum value. This causes the converter's output current to fall as fast as it can. When the output voltage is within the window formed by these two threshold limits, a linear feedback loop controls the duty ratio such that the output voltage settles to its nominal value when load transients are not occurring.

As a modification to this approach, some control circuits use a simpler "bang" control in which only one threshold level (say at 3% below nominal) is used to override a linear feedback control loop. This approach might be chosen when the converter is required to respond quickly to only one polarity of a load current transient.

The techniques of interleaving and bang-bang (or bang) control are sometimes combined to further improve a converter's speed of response.

The control circuit that drives multiple interleaved converters must maintain a reasonable balance of power among the individual converters. One way to do this is to sense the current in each converter and to provide circuitry that modifies the duty ratio of each converter such that its current matches that of the others. The bandwidth of this current balancing circuitry is typically low (by a factor of 10 or more) compared to the bandwidth of the linear feedback loop that controls the converter's output voltage.

With such a current balancing technique, a problem arises when bang-bang (or bang) control is used. When the bang-bang control feature is activated, the normal cyclic operation of the individual converters is disturbed in an unequal manner.

For example, assume that the output voltage falls below its lower threshold value and that the duty ratios of all the converters are set to 100% (i.e., the main switch of each converter is turned on and the freewheeling switch is turned off). During this "bang interval," which lasts until the output voltage rises back above the lower threshold (perhaps with some hysteresis), some of the converters might have had their main switch on anyway, and so their operation would be unaffected. Other converters might have had their freewheeling switch on for the full bang interval, and so their operation would be significantly affected since they would "miss" a portion of their freewheeling interval. Of course, a converter might have had its freewheeling switch on for only a portion of the bang interval, and so its operation would be only partially affected as it misses a smaller amount of its freewheeling interval.

In all cases of this example, the "affect" is to raise the current level in a converter above the level it would have been had the bang control not been activated. Since the affect on each converter is unequal, the result is that the current levels in the various converters are no longer equal.

A similar result can occur if the output voltage goes too high and the bang-bang controller forces the duty ratio to 0% (i.e., all the freewheeling switches are turned on and the main switches are turned off). In this case, those converters that would have had their main switches on for at least a portion of this bang interval have their current levels lowered with respect to other converters that would not have.

If only a single disruption like this occurs at a time, the current balancing circuitry will eventually bring the current levels in the individual converters back into balance. However, if several disruptions occur quickly compared to the bandwidth of the balancing circuitry, then it is possible that the currents in some converters will rise too high. Conversely, other converters might have their currents fall so low that discontinuous operation occurs (when the freewheeling switch is a diode) or the switch current goes negative (when a synchronous diode is used).

SUMMARY OF THE INVENTION

To overcome this problem, the invention described herein "momentarily interrupts" (i.e., puts on hold) the oscillator circuitry that provides the cyclic switching action of the individual converters during the bang interval. During this interruption, the control circuit turns on either the main switches or the freewheeling switches of all the converters, depending on the action required. Once the bang interval is over, the invention "enables" the oscillator circuitry (i.e., the oscillator is allowed to run again, starting at the same point in its cycle where it had been interrupted). At this point, each converter goes back to having either the main switch or the freewheeling switch turned on, whichever is appropriate for its location in its switching cycle.

By interrupting the oscillator circuitry, the bang interval affects all of the individual converters equally, and none misses a portion of its normal operating cycle. The currents in each converter therefore rise (or fall) exactly the same amount (assuming all other things are equal) during the bang interval. The build-up of a current imbalance due to repeated disruptions is therefore avoided.

Thus, in accordance with the present invention, a first power converter is responsive to a first oscillator signal to provide a first power to an output. A second power converter is responsive to a second oscillator signal, out of phase with respect to the first oscillator signal, to provide a second power to the output. Override circuitry overrides the first and second oscillator signals to change the output power of both power converters to correct the output. With removal of the override, the first and second oscillator signals continue from points in their cycles at which they were overridden.

In one embodiment, the power converters are voltage converters, and the power output of each power converter is changed by changing current in an output inductor.

At least one oscillator driving the first and second oscillator signals may be frozen when the first and second oscillator signals are overridden. In the oscillator, cyclic charging and discharging of a capacitor may be interrupted during override so that the capacitor voltage remains substantially constant during the override. A single oscillator may drive both oscillator signals.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The invention will be described as it applies to two interleaved non-isolated "buck" (or "down") converters connected in parallel. One skilled in the art will know how to apply the concepts presented here to other power converters including other dc/dc converter topologies, whether buck or boost, non-isolated or isolated. The converters can be voltage or current converters in parallel or series. In addition, the buck converters shown here will use synchronous rectifiers for their freewheeling switches, but diodes could be used instead.

Figure 1:
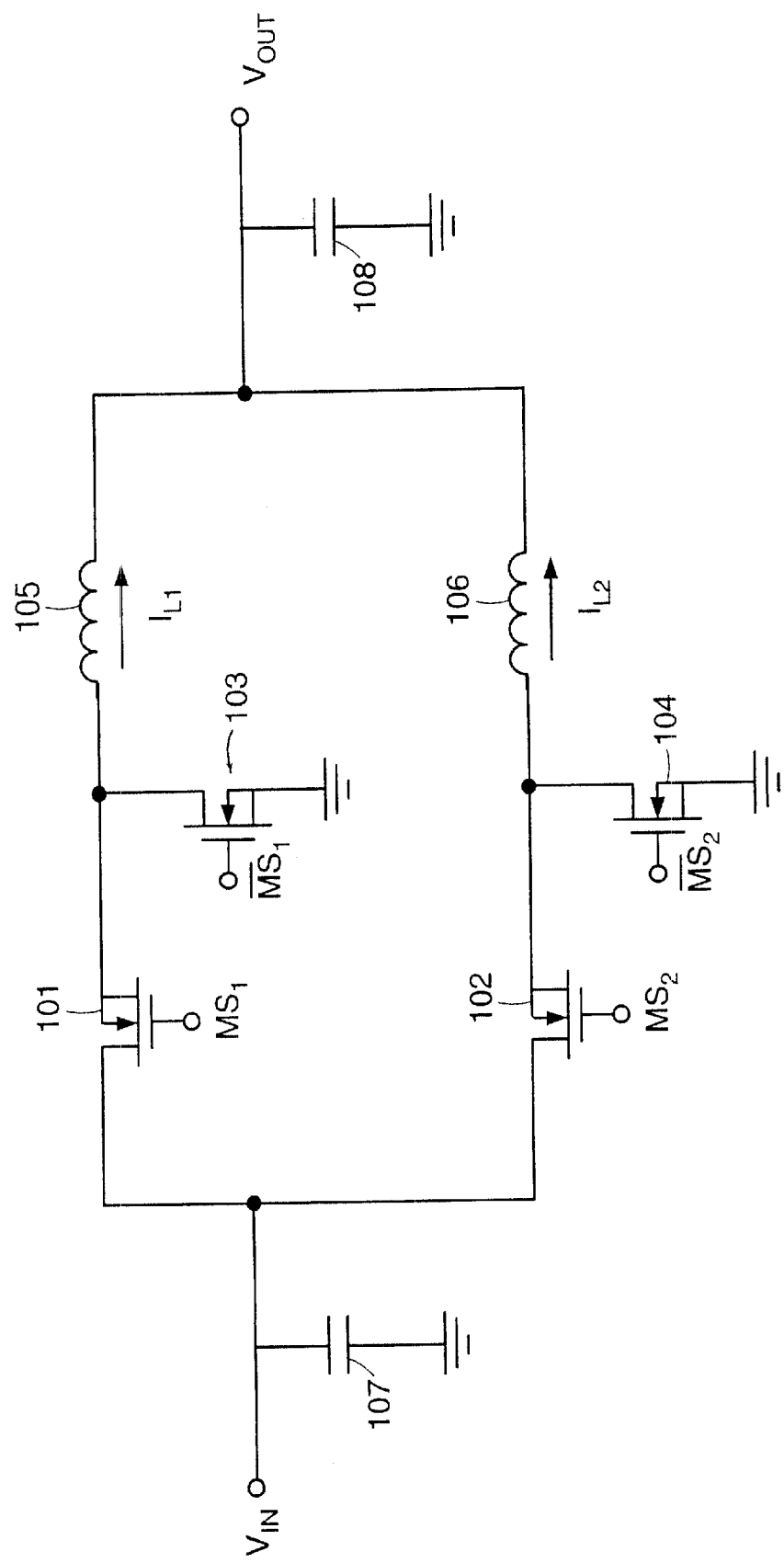
FIG. 1 is a schematic illustration of two buck converters connected in parallel.
Figure 2:
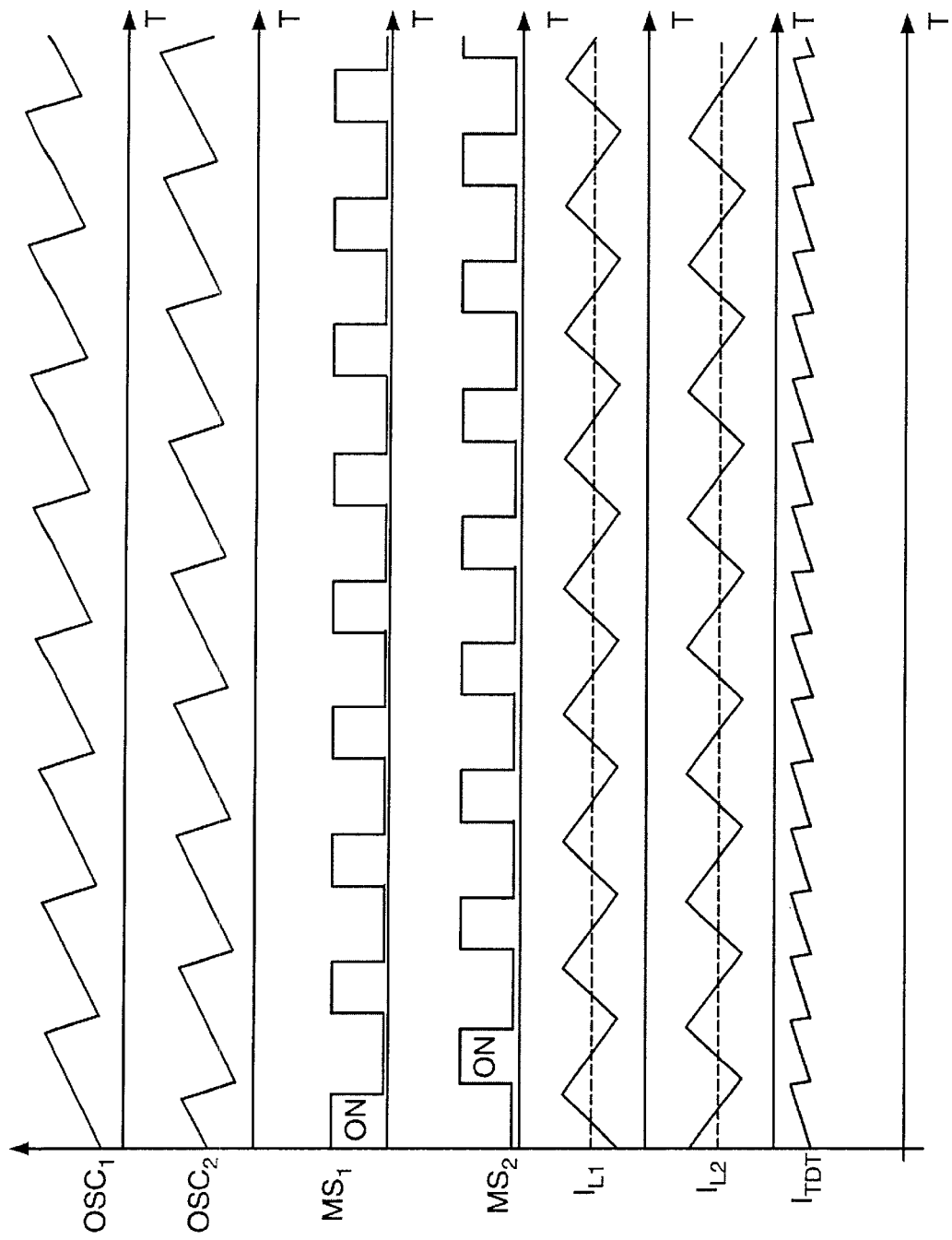
FIG. 2 presents timing waveforms for the interleaved converter of FIG. 1.

FIG. 1 shows two buck converters connected in parallel. FIG. 2 provides timing waveforms for these two converters when their switch instants are phased 180 degrees with respect to each other. The conduction intervals for main switches 101 and 102 are shown in the waveforms labeled $MS_1$ and $MS_2$. For this example, when the main switches are not conducting, the freewheeling switches 103 and 104 are. The conduction intervals for these switches are therefore the complements of $MS_1$ and $MS_2$, respectively. Of course, at light loads the freewheeling switches might be turned off before the end of the cycle to prohibit negative current flow, just as would happen if diodes were used for these switches.

The $MS_1$ and $MS_2$ waveforms are created in the usual fashion by comparing a saw-tooth waveform generated by an oscillator circuit with an analog feedback signal. FIG. 2 shows two such saw-tooth waveforms, $OSC_1$ and $OSC_2$, one for each buck converter. As can be seen, the two waveforms are phased by 180 degrees with respect to one another. The analog feedback signal is chosen to give a duty ratio of 40% for each converter in this example, although any duty ratio might be used.

The waveforms $I_{L1}$ and $I_{L2}$ in FIG. 2 show the currents that result in the inductors 105 and 106, respectively. These currents have a dc component (the dashed line) and a ripple component that can be determined in a well-known manner. The ripple components are phased by 180 degrees with respect to each other.

The waveform $I_{TOT}$ shows the total current that results when $I_{L1}$ and $I_{L2}$ are added together. As can be seen, the amplitude of the ripple component in this total current is smaller than the ripple in either $I_{L1}$ or $I_{L2}$. This is the advantage that interleaving offers. Exactly how much the ripple amplitude of the total current is reduced compared to the ripple of an individual converter is a function of the duty ratio and the number of converters that are interleaved (see Brett A. Miwa, David M. Otten and Martin F. Schlecht, "High Efficiency Power Factor Correction Using Interleaving Techniques, 1992 IEEE 7$^{th}$ Applied Power Electronics Conference, Feb. 23–27, 1992, pp. 557–568).

Figure 3:
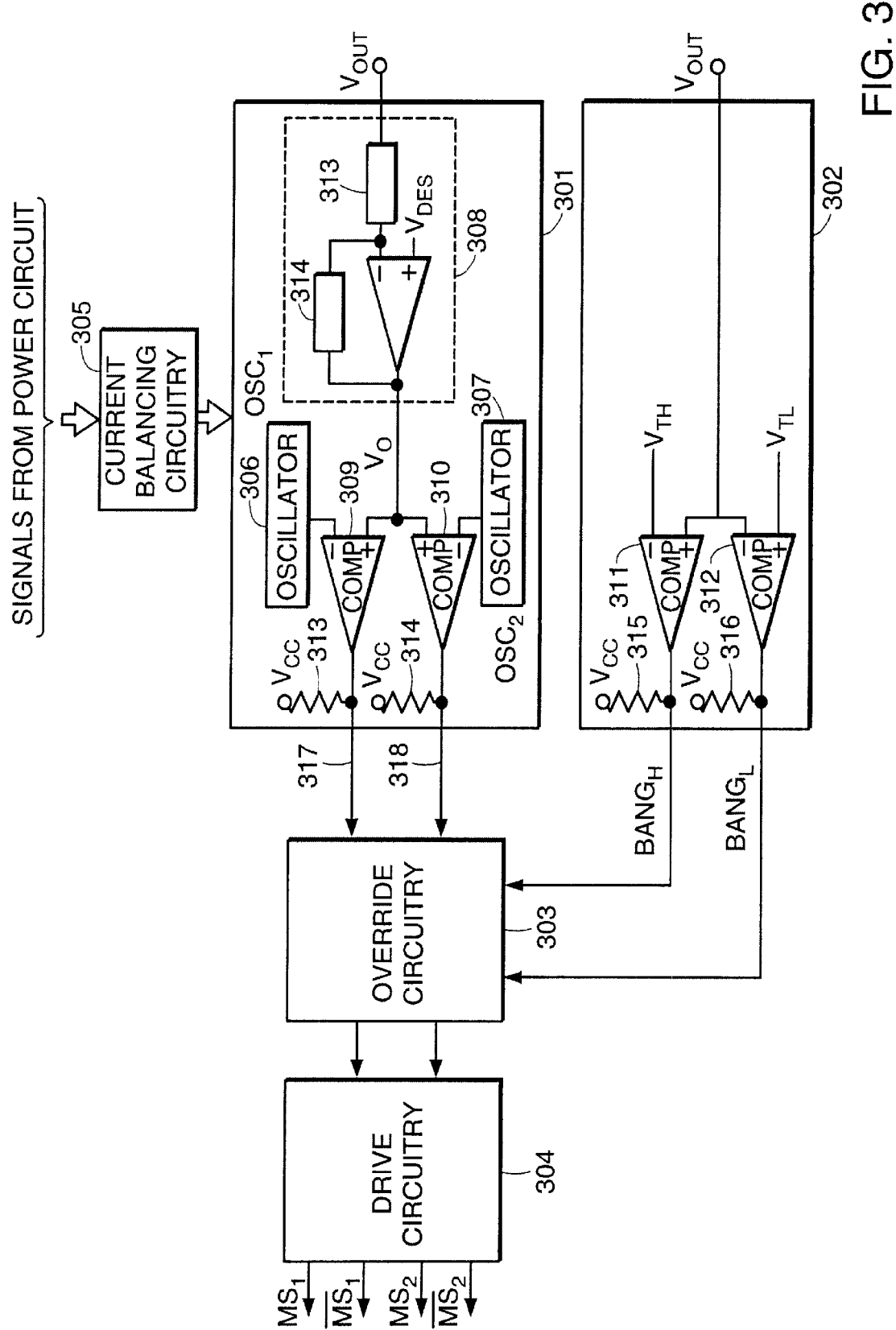
FIG. 3 illustrates a control circuit for the interleaved converter of FIG. 1.

FIG. 3 shows a control circuit for the interleaved converter of FIG. 1. In this circuit there is both linear feedback loop circuitry 301 and bang-bang control circuitry 302. The former controls the duty ratio of the converters to maintain the output voltage, $V_{out}$, at its desired, or nominal, value under normal conditions. The latter "overrides" the former (i.e., its signals are used to control the switches) whenever the output voltage falls outside of the minimum and maximum threshold values set by the bang-bang control circuitry. Override circuitry 303 ensures that the proper signals are provided to the drive circuitry 304. In addition, current balancing control circuitry 305 ensures a reasonable balance of the dc components of the currents in inductors 105 and 106.

The linear feedback circuitry depicted in FIG. 3 has two oscillator circuits 306 and 307 that create out-of-phase saw-tooth waveforms $OSC_1$ and $OSC_2$. There is also an error amplifier circuit 308 that amplifies (with proper frequency compensation provided by impedances 313 and 314) the error between the actual output voltage, $V_{out}$, and its desired value, $V_{des}$. The output of this error amplifier, $V_D$, is an analog signal proportional (with perhaps some offset) to the desired duty ratio. Comparators 309 and 310 compare this duty ratio signal with the two saw-tooth waveforms, respectively. These comparators create two digital output waveforms that indicate the conduction intervals of the main switches 101 and 102 (and therefore, by definition, the conduction intervals of the freewheeling switches 103 and 104) if the bang-bang control circuit is not active.

Some PWM circuits use latches that are set at the beginning of each cycle and reset when the comparator changes state.

The bang-bang control circuitry has two comparators 311 and 312. Comparator 311 has an output, $BANG_L$, that goes high when the output voltage falls lower than a threshold $V_{TL}$ set, for example, 3% below the nominal value. Comparator 312 has an output, $BANG_H$, that goes high when the output rises higher than a threshold $V_{TH}$ set, for example, 3% above the nominal value. These comparators may or may not have hysteresis.

Override circuitry 303 normally takes the output waveforms from comparators 309 and 310 (waveforms 317 and 318) and sends them to drive circuitry 304 which creates the proper signals to drive the switches 101 through 104. However, when the output of comparator 312, $BANG_L$, is high, override circuitry 303 will ignore waveforms 317 and 318. It will instead send a signal to the drive circuitry 304 that will cause main switches 101 and 102 to turn on (and freewheeling switches 103 and 104 off). Conversely, if the output of comparator 311, $BANG_H$, is high, override circuitry will send a signal to the drive circuitry that will cause the freewheeling switches to turn on and the main switches to turn off. Override circuitry 303 can be accomplished with digital circuitry in a well known manner.

Although not shown in FIG. 3, it is typical to first divide down the output voltage with a resistor divider before it is compared to similarly scaled desired and threshold voltage levels.

Figure 4:
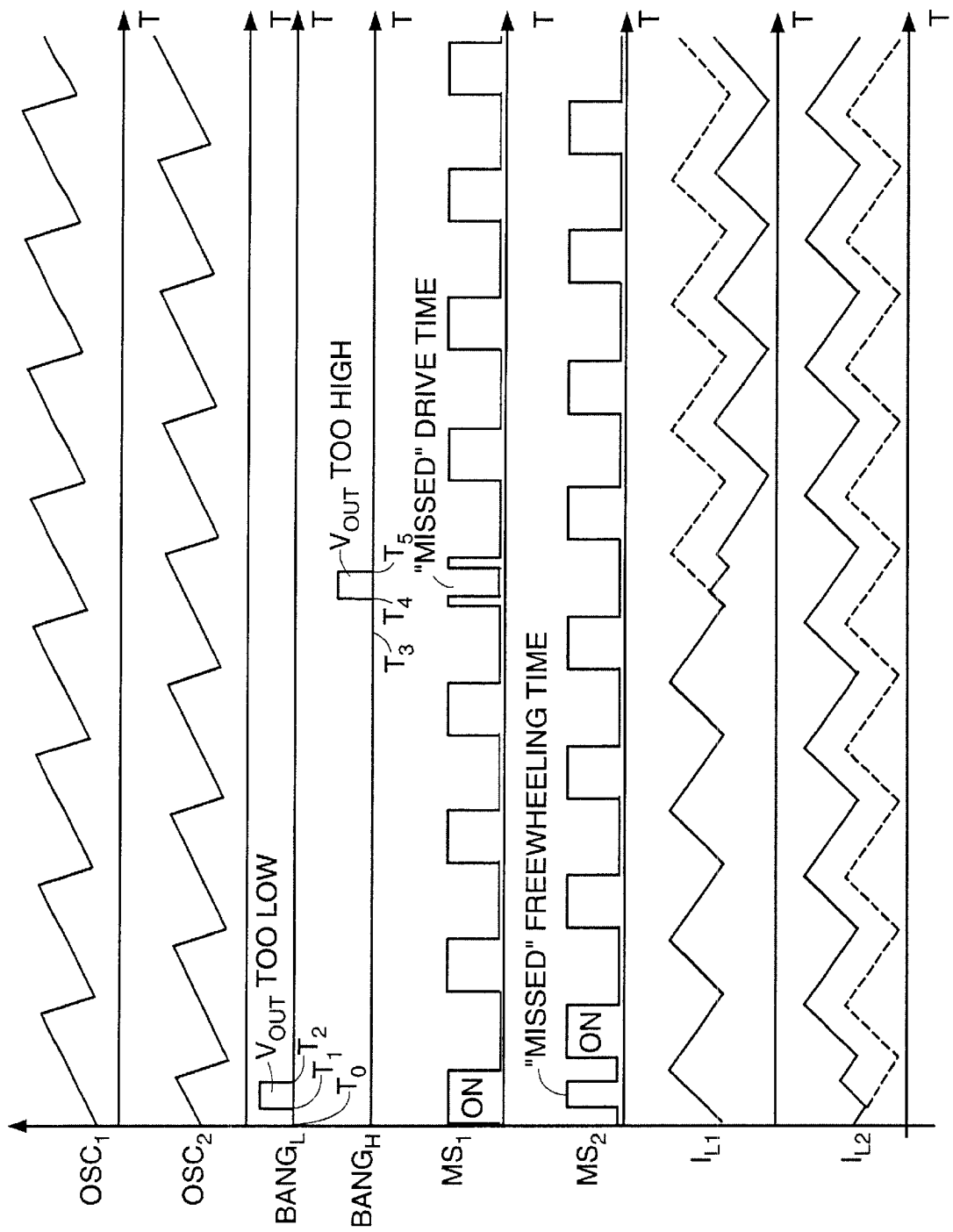
FIG. 4 presents timing waveforms illustrating momentary current imbalance due to bang intervals.

The waveforms in FIG. 4 show how the bang-bang control can cause the currents in the two interleaved converters to become momentarily unbalanced. Although not shown, it is assumed the $V_D$ remains relatively constant over the number of cycles shown in FIG. 4. This is an accurate assumption since the bandwidth of the linear feedback circuit is slow compared to the switching frequency.

Assume that at t0 the load current $I_{out}$ makes a positive step change and the output voltage $V_{out}$ begins to fall. When $V_{out}$ crosses below the minimum threshold of the bang-bang control circuitry at t1, both main switches 101 and 102 are turned on until the voltage returns above the threshold (with perhaps some hysteresis) at $t_2$.

During the bang interval between $t_1$ and $t_2$, both inductor currents $I_{L1}$ and $I_{L2}$ rise. However, since the bang interval in this example occurred when main switch 101 would have been on anyway, $I_{L1}$ is unaffected. In comparison, $I_{L2}$ increases (following the solid line in FIG. 4) during the bang interval instead of decreasing (following the dotted line) as it would have if the freewheeling switch 104 had been left on. As can be seen, the result is that the dc component of $I_{L1}$ is unaffected by the bang interval, but the dc component of $I_{L2}$ is increased.

Now assume that at $t_3$ the load current makes a negative step change and the output voltage rises above the maximum threshold of the bang-bang control circuitry (again assuming some hysteresis) between the times $t_4$ and $t_5$. During this bang interval, both freewheeling switches 102 and 104 are turned on and the currents $I_{L1}$ and $I_{L2}$ decrease. In this case, this second bang interval occurs when freewheeling switch 104 would have been on anyway, so $I_{L2}$ is unaffected. However, $I_{L1}$ decreases (following the solid line) instead of increasing (following the dotted line) as it would have if the main switch 101 had been left on. The result is that the dc component of $I_{L1}$ decreases, while the dc component of is unaffected.

As can be seen at the right hand side of FIG. 4, if two bang intervals occur relatively quickly and with the right timing, it is possible for the dc currents flowing through the two inductors to get significantly out of balance. Of course, many more such bang intervals arriving quickly will make this imbalance even larger. One of the two currents could then rise so high that a magnetic core is saturated or the current rating of a switch is exceeded. The other current could fall so low that it goes below zero (for at least part of the cycle) and reduces the converter's efficiency as power is drawn back from the load. If the freewheeling switch is turned off (or a diode is used) to prevent this negative current flow, then the symmetry of the ripple waveforms between the two converters is lost and the ripple cancellation is reduced.

The ability of the current balancing circuitry to correct this problem is limited by its bandwidth. Typically, this bandwidth is slower than the bandwidth of the linear feedback loop that controls the output voltage when there are no load transients. Many loads can have load transients that repeat at a much faster rate than this. The problems outlined above are therefore very likely to happen.

Figure 5:
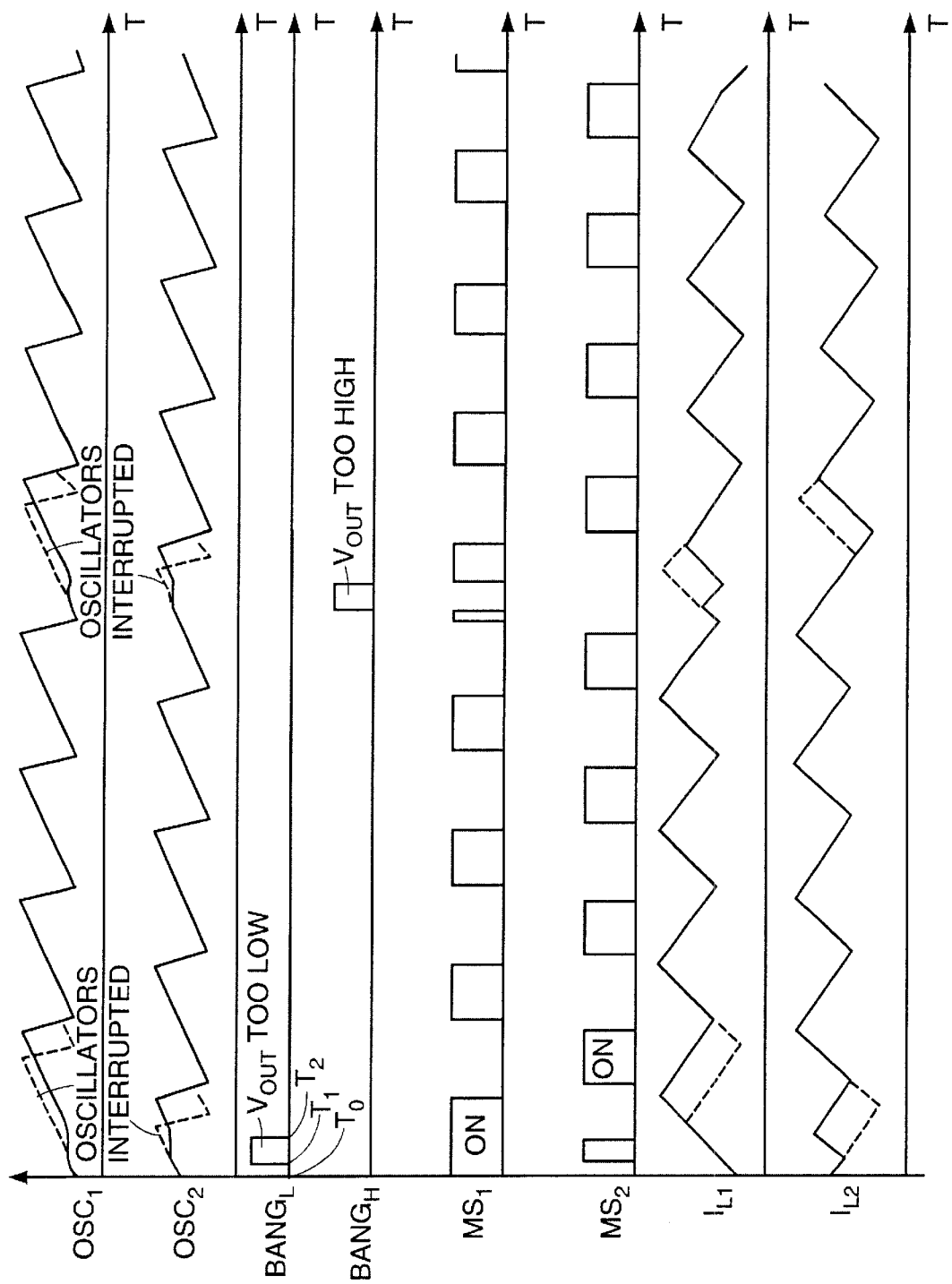
FIG. 5 presents timing waveforms illustrating interruption of oscillators to maintain current balance.

The waveforms of FIG. 5 show a way to overcome this problem. In this figure, the oscillatory circuits 306 and 307 are momentarily interrupted during the bang intervals between $t_1$ and $t_2$ and between $t_4$ and $t_5$. By this it is meant that during the bang intervals, the oscillator that determines the evolution of the switching cycle for each of the interleaved converters is put on hold wherever it was at the start of the bang interval. Once the bang interval is over, the oscillator is then enabled again at the point in its cycle that it had been interrupted, and it continues from that point until the next bang interval occurs. As before, $V_D$ is assumed to remain relatively constant over the cycles shown in FIG. 5.

In FIG. 5, the BANG$_L$ and BANG$_H$ signals indicate the timing of the two bang intervals. It also represents the intervals during which the oscillator circuits are interrupted. Signals OSC$_1$ and OSC$_2$ are the outputs of the two oscillator circuits 306 and 307. As can be seen, during a bang interval these normally saw-toothed shaped waveforms are maintained constant at the level they were at when the bang interval started. Once the bang interval ends the saw-toothed waveforms continue to rise from this constant level and finish their respective cycles. Because of the interruption, these cycles end later (by the length of the bang interval) than they would have had they not been interrupted.

During the first bang interval in FIG. 5, the output voltage is too low, and so the main switches 101 and 102 are turned on. Both I$_{L1}$ and I$_{L2}$ therefore rise by the same amount during this interval. However, once the interval is over both circuits proceed in time as they would have had the bang interval not occurred, except for the associated delay of the bang interval. The only difference is that I$_{L1}$ and I$_{L2}$ are now both higher (following the solid lines) than they would have been (following the dotted lines) had the bang interval not occurred. By not "missing" part of the normal oscillator cycle, both inductor currents are affected equally by the bang interval.

Similarly, FIG. 5 shows that the second bang interval, which causes both freewheeling switches 103 and 104 to be turned on, results in an equal reduction in both I$_{L1}$ and I$_{L2}$.

No imbalance in the inductor currents occurs with this approach, and so none of the inherent problems with a current imbalance can result, no matter how often or how quickly the bang intervals are repeated.

Note, it is possible for two or more bang intervals of the same type (e.g. the output voltage is too low) to occur in a row before a bang interval of the other type occurs. Depending on how they are timed relative to the oscillator waveforms, the problems described above with respect to FIG. 4 can occur and the "oscillator interruption" approach described with respect to FIG. 5 will solve these problems.

Figure 6:
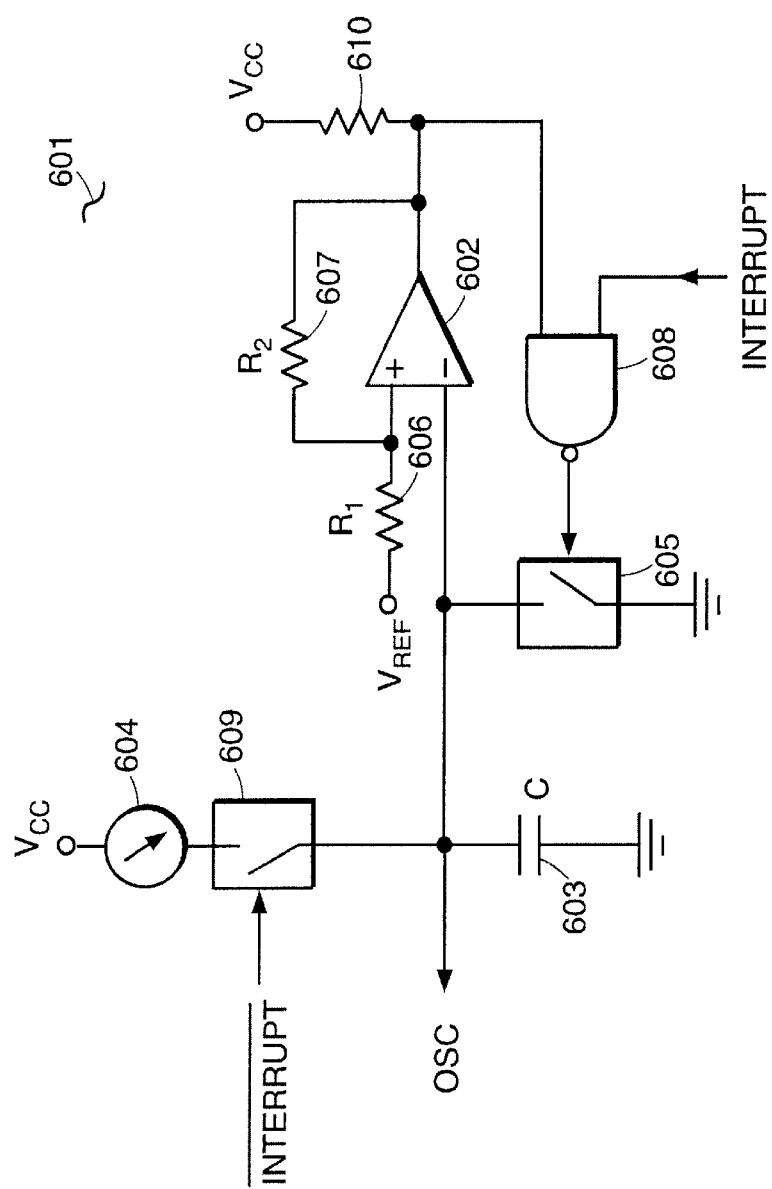
FIG. 6 is a schematic illustration of one implementation of an interruptible oscillator circuit.

FIG. 6 shows one way to implement the interruption of the oscillator circuit. In this figure, an oscillator circuit 601 creates its saw-tooth waveform with a circuit composed of a comparator with hysteresis 602, a timing capacitor 603, a current source 604 in series with a disconnect transistor 609, and a reset transistor 605. For generality, both disconnect transistor 609 and reset transistor 605 are shown as a switch with a control terminal, where the switch is closed when the voltage at the control terminal is high. One skilled in the art would know how to implement these switches and their control drives with common devices.

This design is typical, although other circuit techniques (both analog and digital) are well known in the art. For example, the current source could be replaced with a resistor, and the reset transistor could have a resistor in series with it. Doing so alters the shape of the voltage waveform across the timing capacitor in a known way that does not affect the concepts presented here. For instance, when the current source is replaced with a resistor, the oscillator waveform will have exponential curvatures instead of straight lines. Adding a resistor in series with the reset transistor will lengthen the fall time of the oscillator's output waveform relative to its rise time. A current source could also be used in the reset path.

In addition, the control circuit of an interleaved converter needs to have good symmetry among the individual oscillators if the full amount of ripple cancellation is to be achieved. For instance, the saw-tooth waveforms must have the same amplitudes and the correct phasing. Techniques to achieve this symmetry include the use of matched components and the use of circuitry that senses some lack of symmetry between the converters and corrects the imbalance.

In this oscillator circuit design, the current source 604 charges the timing capacitor 603, whose voltage rises linearly. When this voltage exceeds the higher threshold of the comparator 602, the output of the comparator changes state, which turns on the reset transistor 605 and the timing capacitor is discharged. Once the capacitor's voltage drops below the comparator's lower threshold, the reset transistor is turned off and the cycle begins again. The voltage across the timing capacitor is the saw-tooth shaped waveform discussed earlier (say, perhaps, OSC$_1$).

When the bang-bang control circuit indicates that a bang interval is occurring with a high "INTERRUPT" signal, the current source 604 is disconnected from the timing capacitor as transistor 609 turns off (another approach would be to set the value of the current flowing through the source to zero). In addition, if reset transistor 605 is on, it is turned off. The voltage across capacitor 603 then remains substantially constant during the interrupt since no current is flowing through it, though there may be a small amount of leakage. Once the bang interval ends, the current source reconnected to the timing capacitor and the reset transistor is allowed to turn on if that is its desired state. The capacitor voltage then continues either to rise to its upper threshold value or fall to its lower threshold value, depending on it is in its cycle.

Figure 7:
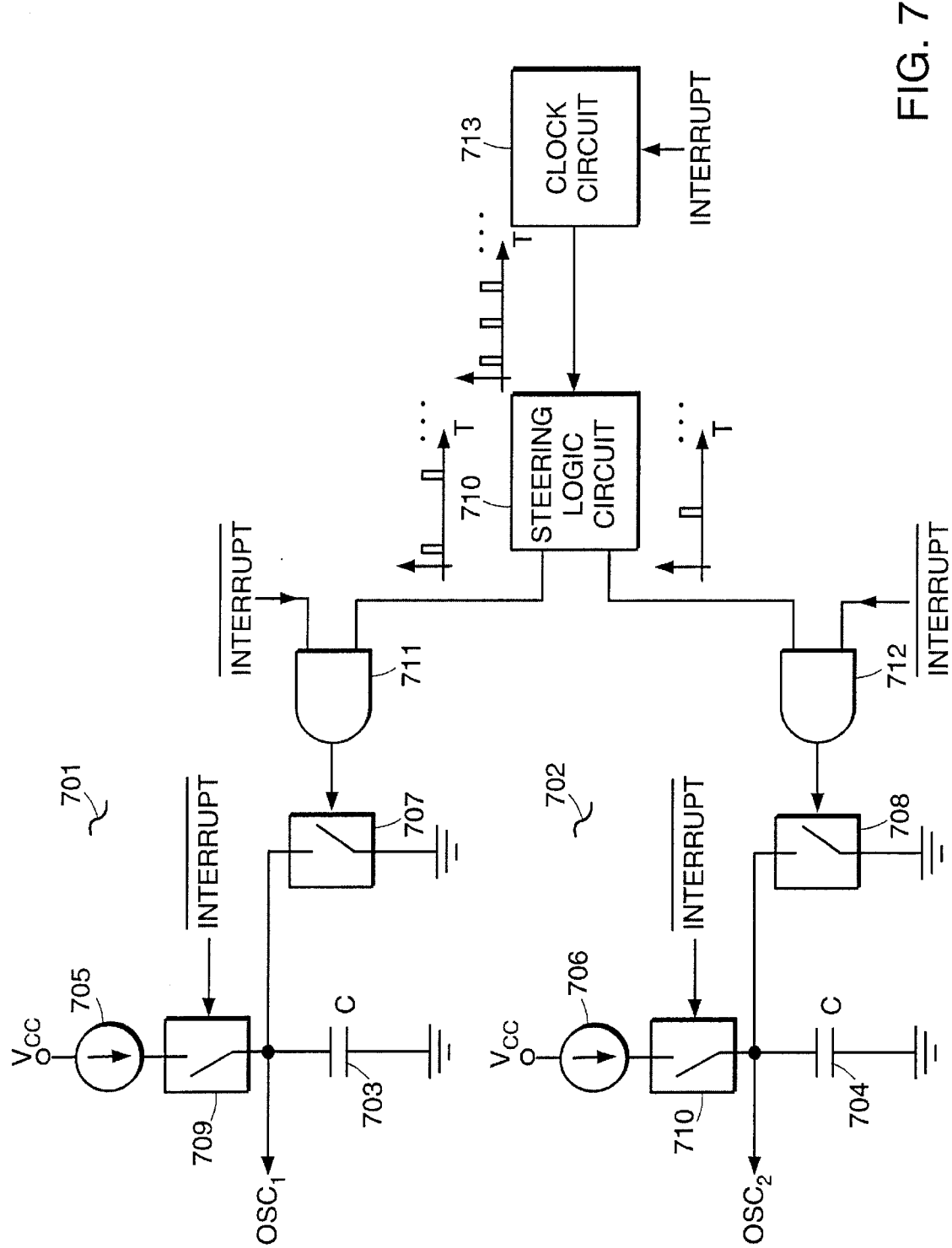
FIG. 7 is a schematic illustration of one implementation of an interruptible multiple-oscillator circuit with 180° phase shift.

While FIG. 6 shows one way to implement an interruptible oscillator, it does not show how to have two such oscillators whose output waveforms are shifted by 180 degrees. There are various ways to do this. One is shown in FIG. 7. In this circuit, each oscillator 701 or 702 is composed of a timing capacitor 703 (or 704), a current source 705 (or 706), and a reset transistor 707 (or 708). In addition, there is a separate "clock" circuit 713 that operates at a frequency equal to the overall switching frequency multiplied by the number of interleaved converters. This clock circuit has its own oscillator within it that may be achieved with any of several well known techniques, including the one shown in FIG. 6 (i.e., 601 or 602).

The output of the clock circuit is a pulse train. A steering logic circuit 710 sends each successive pulse to one of the individual reset transistors, each in turn, and then repeats the cycle. That is, in this example the steering logic sends one pulse to reset transistor 707, the next pulse to reset transistor 708, and then back to transistor 707, and so on.

When each reset transistor receives a pulse, it turns on and discharges its respective timing capacitor. When the pulse ends, the reset transistor turns off and the timing capacitor is charged by its respective current source until the next time that this reset transistor receives a pulse. The voltage across the timing capacitor is therefore a saw-tooth waveform, and the two capacitors have waveforms that are phased 180 degrees with respect to one another.

Once again, the current sources shown in FIG. 7 could be replaced with resistors, and the reset transistors could have resistors in series with them. Doing so alters the shape of the voltage waveforms across the timing capacitors in known ways that do not affect the concepts presented here.

Note that with the technique shown in FIG. 7, two things must happen when a bang interval occurs and the oscillators are to be interrupted. First, the current sources 705 and 706 are either set to zero current or they are disconnected from the timing capacitors, and, if reset transistors 707 or 708 are on, they are turned off. The voltages across capacitors 703 and 704 then remain constant. Second, the oscillator in the clock circuit must similarly be interrupted. If this oscillator is like the ones shown in FIG. 6 (i.e., 601 or 602) then it can be interrupted in the same manner as those oscillators were interrupted.

Once the bang interval ends, the current sources 705 and 706 are returned to their normal current values (or reconnected to the timing capacitors), and the reset transistors 707 and 708 are allowed to turn on if that is their desired state. The oscillator in the clock circuit is also enabled. The voltages across the timing capacitors 703 and 704 will then pick up from where they had left off before the bang interval started.

Figure 8:
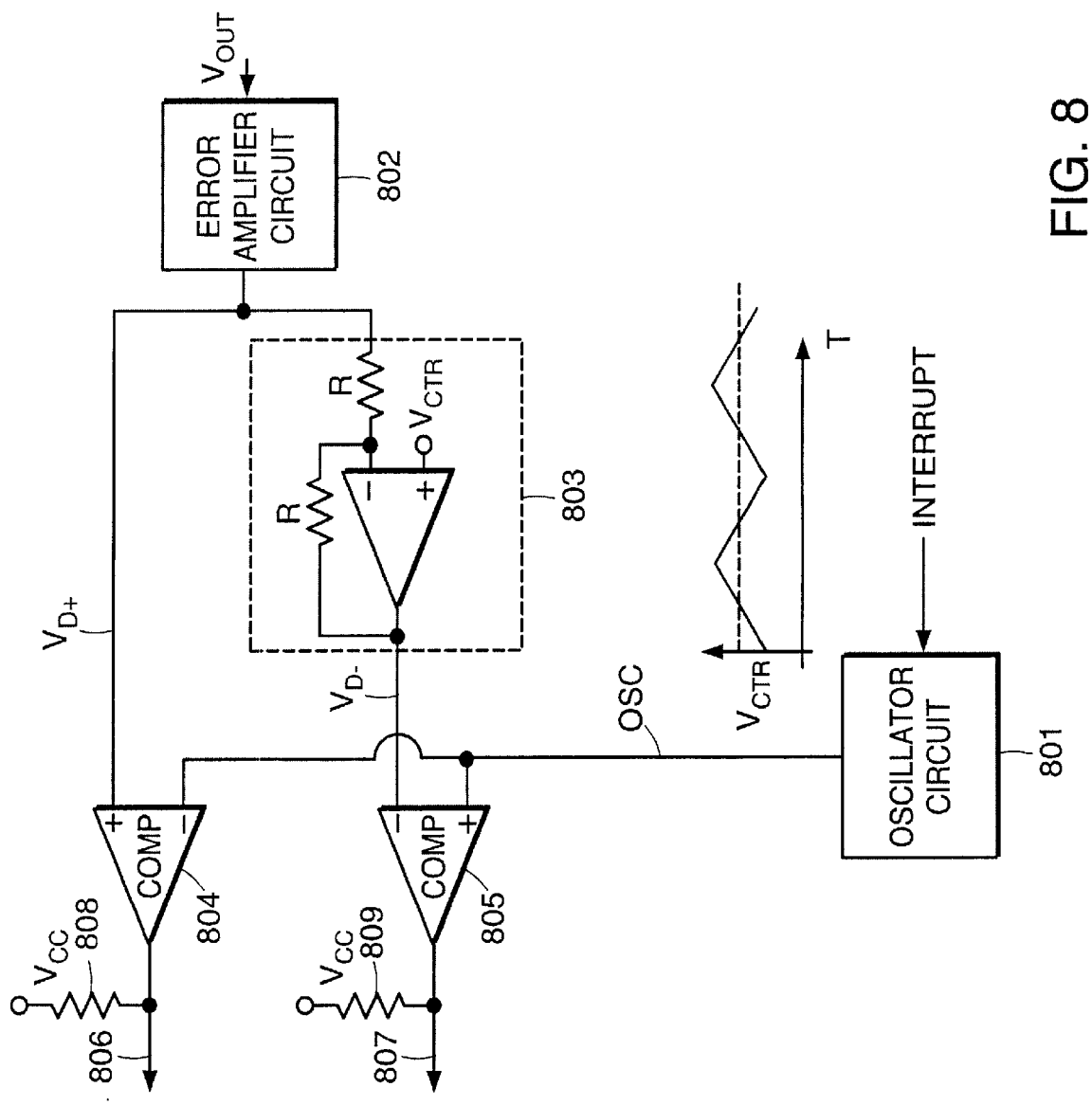
FIG. 8 is a schematic illustration of a circuit using positive and negative duty ratio signals to achieve two, 180° phase-shifted digital signals from one oscillator waveform.

Another way to provide phase-shifting is depicted in FIG. 8. This approach works when there are an even number of interleaved converters, in which case they can be grouped into pairs that are phase shifted 180 degrees with respect to one another. FIG. 8 addresses the two-converter case, but its application is more general in that two such oscillator circuits, phase by 90 degrees, could provide the oscillator signals for the first and third, and the second and forth, converters of a four interleaved converter system, respectively.

As can be seen from FIG. 8, there is only one oscillator 801 whose output 808, in this case, is depicted as a triangular shaped waveform (i.e., a balanced saw-tooth waveform), although it need not be. This waveform is centered on a voltage $V_{ctr}$. An error amplifier circuit 802 subtracts the actual output voltage from the desired value, multiplies the error voltage by some gain, and creates an analog signal $V_{D+}$ that is proportional to the desired duty ratio. A unity-gain, inverting amplifier 803, using the voltage $V_{ctr}$ as a reference connected to its non-inverting input, then creates another analog signal $V_{dr-}$, where $(V_{D-}-V_{ctr})=-(V_{D+}-V_{ctr})$. In other words, $V_{D-}$ is the negative of $V_{D+}$ when both signals are measured with respect to $V_{ctr}$. For convenience, we will refer to $V_{D+}$ as a "positive duty ratio signal" and $V_{D-}$ as a "negative duty ratio signal", even though they are not positive and negative in an absolute sense.

Comparators 804 and 805 compare these positive and negative duty ratio signals with the triangular waveform from oscillator 801. These comparators create the two digital output waveforms 806 and 807 that indicate the conduction intervals of the main switches 101 and 102 (and therefore, by definition, the conduction intervals of the freewheeling switches 103 and 104) when they are not overridden during a bang interval. By nature of how they are created, waveforms 806 and 807 are automatically 180 degrees out of phase with respect to each other.

Whenever a bang interval occurs, it is simply necessary to interrupt the oscillator 801 such that its waveform remains constant for the duration of the interval, and then enable it such that the waveform picks up where it left off. This interruption can be achieved with the techniques described above, e.g. disconnecting a current source and turning off the reset transistor. Of course, the override circuitry must make sure that the proper switches are turned on in the converters during this interval, as well.

Figure 9:
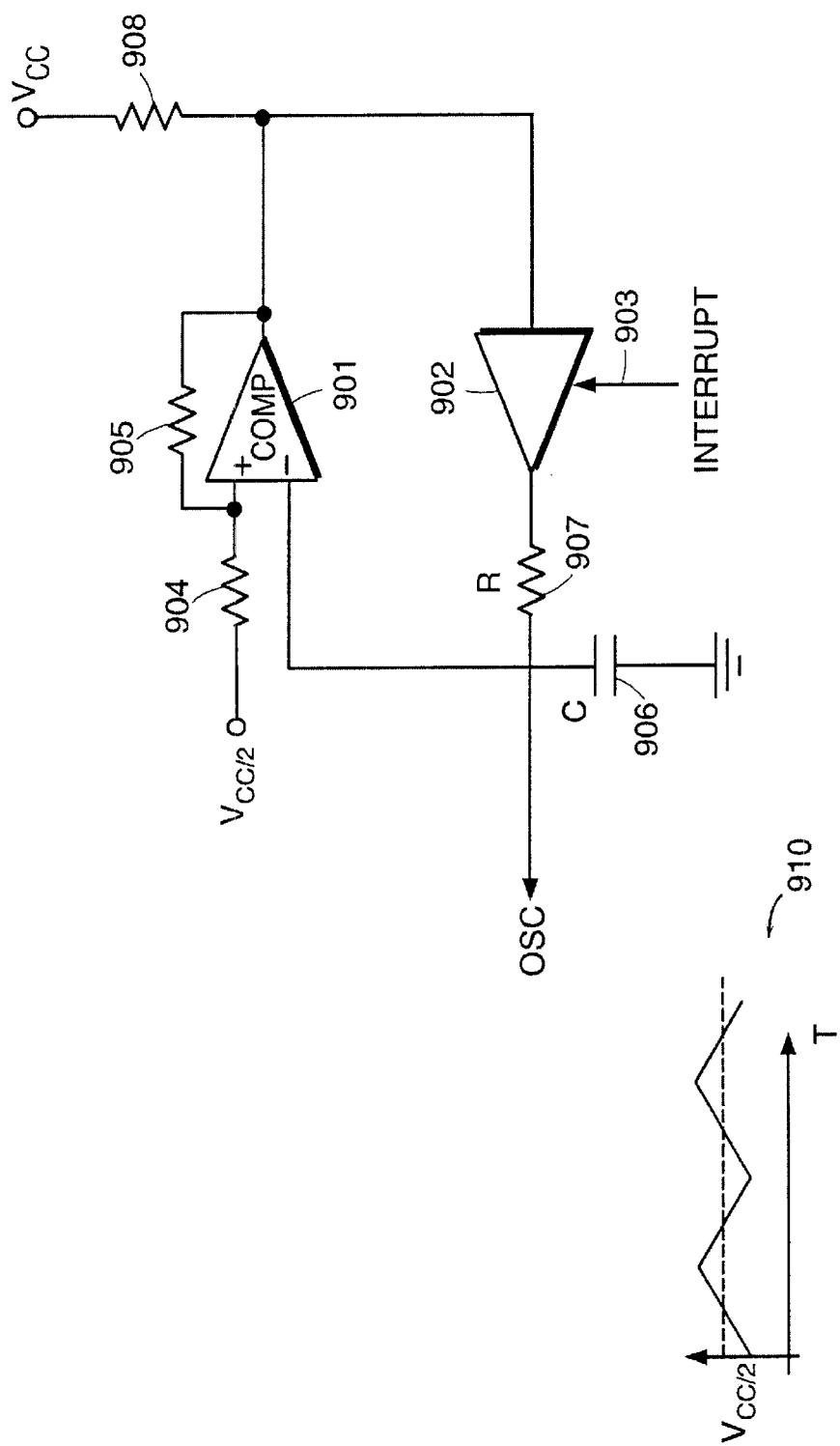
FIG. 9 is a schematic illustration of one implementation of the oscillator circuit of FIG. 8.

Note that the output of oscillator 801 need not be triangular shape for this scheme to work. For example, the oscillator circuit shown in FIG. 9 shows one way to implement the oscillator of FIG. 8 where the oscillator waveform is composed of exponentially shaped pieces. In this circuit, device 901 is a comparator and device 902 is a tri-state buffer whose output can be put into an open circuit mode by applying a signal to its disabling input 903. The circuit is powered from a control supply voltage of $V_{cc}$. One half of $V_{cc}$ is used as a reference voltage for the comparator. This reference voltage is the center voltage for the oscillator's output waveform. That is, $V_{ctr}=V_{cc}/2$. Capacitor 906 is the timing capacitor. The voltage across this capacitor is the output of the oscillator. Resistor 907 controls the rate at which the timing capacitor is charged and discharged, and resistors 904 and 905 provide hysteresis to the comparator. Resistor 908 is a pullup resistor for the output of comparator 901.

Assume that the hysteresis of the comparator 901 is such that the high threshold is 1 V above Vctr and the low threshold is 1 V below Vctr. The oscillator waveform will rise and fall between these two threshold limits. In one state, when the output of the comparator and the buffer is high, the capacitor voltage will rise as it is charged through resistor 907. When its voltage reaches (Vctr+1 V), the comparator will change state, its output and that of the buffer will go low, and the timing capacitor's voltage will fall as it is discharged through resistor 907. As shown in FIG. 9, the capacitor's voltage waveform 910 is composed of exponential curves with a characteristic time constant given by the product of capacitor 906 and resistor 907.

To interrupt this oscillator during a bang interval, an appropriate signal should be applied to the disabling input 903 of the tri-state buffer. When this is done, the buffer's output becomes an open circuit, and no current can flow through resistor 907 to charge or discharge capacitor 906. When the bang interval is over, the buffer is enabled, and the timing capacitor continues to be charged or discharged, depending on the state of the oscillator before the bang interval began.

As discussed above, the bang control may be activated when the output voltage exceeds a threshold. Other methods of activating the bang control are also possible. For example, one may use the output voltage as well as its derivative to determine when a bang interval should begin and end. The two variables may be summed together with proper gain, with the sum being applied to the comparator. Since the derivative is related to current, the derivative can be determined by sensing current.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize, or be able to ascertain using no more than routine experimentation, many equivalents to the specific embodiments of the invention described specifically herein. Such equivalents are intended to be encompassed in the scope of the claims. For instance, while the embodiments presented here have been addressed to the control of two interleaved non-isolated buck converters, the concepts also apply directly to other non-isolated and isolated dc/dc converter topologies, and to any number of interleaved units. Also, while the circuits shown here used some analog circuit techniques, the concepts also apply directly to circuits that accomplish these functions with digital circuit techniques. In addition, while the circuits shown here used bang-bang control, the concepts apply directly to circuits using only a bang control.

What is claimed is:

1. A method of power conversion comprising:
    applying a first oscillator signal to a first power converter to provide a first power to an output;

applying a second oscillator signal, out of phase with respect to the first oscillator signal, to a second power converter to provide a second power to the output;

overriding the first and second oscillator signals to change the power output of both power converters to correct the output; and removing override of the first and second oscillator signals and continuing the first and second oscillating signals from points in their cycles at which they were overridden.

2. A method as claimed in claim 1 wherein the power converters are voltage converters.

3. A method as claimed in claim 2 wherein the power converters are down converters.

4. A method as claimed in claim 3 wherein the power output of each power converter is changed by changing current in an output inductor.

5. A method as claimed in claim 1 wherein at least one oscillator driving the first and second oscillator signals is frozen when the first and second oscillator signals are overridden.

6. A method as claimed in claim 1 wherein the first and second oscillator signals are driven by at least one oscillator in which a capacitor is cyclically charged and discharged, and charging and discharging of the capacitor is interrupted during override so that the capacitor voltage remains substantially constant during the override.

7. A method as claimed in claim 6 wherein a single oscillator drives both oscillator signals.

8. An interleaved power converter system comprising:

a first power converter responsive to a first oscillator signal to provide a first power to an output;

a second power converter responsive to a second oscillator signal, out of phase with respect to the first oscillator signal, to provide a second power to the output; and override circuitry which overrides the first and second oscillator signals to change the output power of both power converters to correct the output, the first and second oscillator signals continuing from points in their cycles at which they were overridden with removal of the override.

9. A system as claimed in claim 8, wherein the power converters are voltage converters.

10. A system as claimed in claim 9, wherein the power converters are down converters.

11. A system as claimed in claim 10, wherein the power output of each power converter is changed by changing current in an output inductor.

12. A system as claimed in claim 8, wherein at least one oscillator driving the first and second oscillator signals is frozen when the first and second oscillator signals are overridden.

13. A system as claimed in claim 8, wherein the first and second oscillator signals are driven by at least one oscillator in which a capacitor is cyclically charged and discharged, and charging and discharging of the capacitor is interrupted during override so that the capacitor voltage remains substantially constant during the override.

14. A system as claimed in claim 13, wherein a single oscillator drives both oscillator signals.

15. A power conversion system comprising:

means for applying a first oscillator signal to a first power converter to provide a first power to an output;

means for applying a second oscillator signal, out of phase with respect to the first oscillator signal, to a second power converter to provide a second power to the output;

means for overriding the first and second oscillator signals to change the power output of both power converters to correct the output; and means for removing override of the first and second oscillator signals and continuing the first and second oscillating signals from points in their cycles at which they were overridden.

* * * * *